United States Patent [19]

Rossow

[11] Patent Number: 4,571,809

[45] Date of Patent: Feb. 25, 1986

[54] SHOCK ABSORBER TOOL

[76] Inventor: Robert O. Rossow, 255 Oak St., Hampshire, Ill. 60140

[21] Appl. No.: 609,061

[22] Filed: May 10, 1984

[51] Int. Cl.⁴ .............................................. B23B 27/00
[52] U.S. Cl. ..................................................... 29/270
[58] Field of Search ................. 140/123; 225/103, 93; 72/479; 81/177 R, 177 G; 29/270

[56] References Cited

U.S. PATENT DOCUMENTS

| | | | |
|---|---|---|---|
| 1,347,780 | 7/1920 | Jacoby | 81/177 R |
| 1,658,886 | 2/1928 | Dickey | 81/177 G |
| 2,878,701 | 3/1959 | Weersma | 81/177 G |
| 2,895,364 | 7/1959 | Heinz | 81/177 G |
| 2,990,734 | 7/1961 | Jackson | 72/479 |
| 3,448,508 | 6/1969 | Passage et al. | 29/270 |
| 3,722,555 | 3/1973 | Voelsch | 140/123 |
| 4,056,020 | 11/1977 | Coviello | 81/177 G |
| 4,444,228 | 4/1984 | Demirjian | 140/123 |

Primary Examiner—Robert C. Watson
Attorney, Agent, or Firm—Henderson & Sturm

[57] ABSTRACT

This invention relates to shock absorber tools. Shock absorbers located at hard to reach positions in vehicles are removed more efficiently by a tool which more effectively reaches, and applies leverage to, the shock absorbers. A handle bar (16), (41), is fixed to a body bar (19), (21), (44) at a first angle, and a third bar (23), (48) is fixed to the body bar at a second angle. A head (27), (52) with shock absorber shaft engaging bore (28), (53) is mounted on the third bar.

2 Claims, 8 Drawing Figures

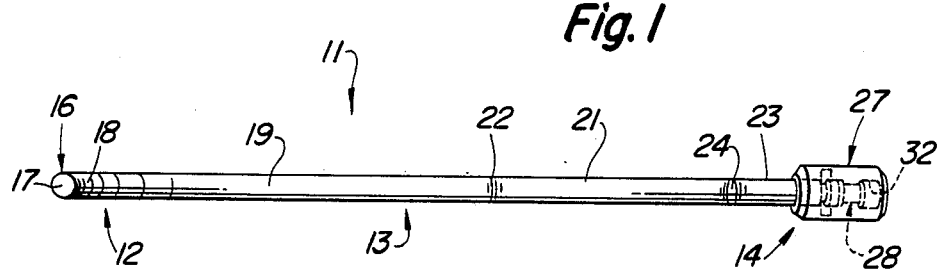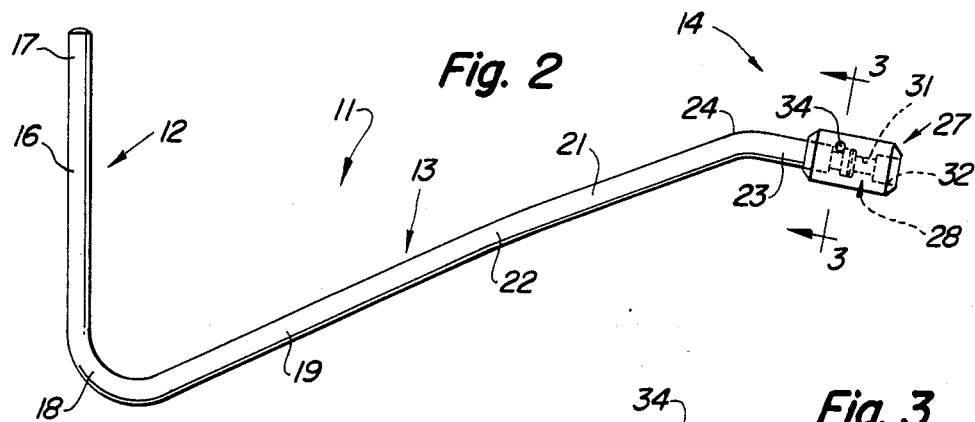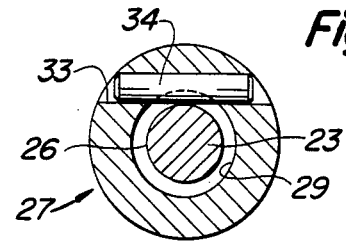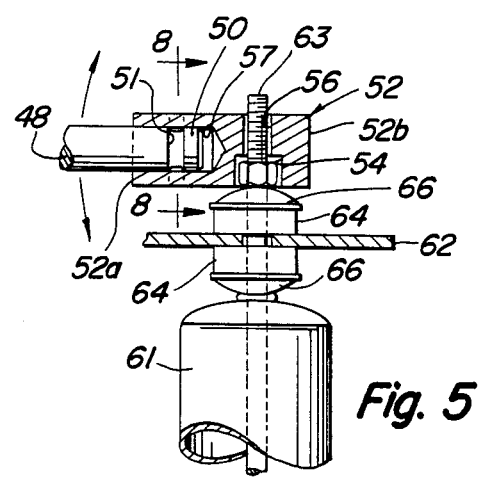

SHOCK ABSORBER TOOL

TECHNICAL FIELD

This invention relates to tools employed by automotive mechanics. More particularly, this tool invention is concerned with removal of shock absorbers from a vehicle.

BACKGROUND ART

Removal of worn out shock absorbers from vehicles is a problem of long standing. Presently, wrenches, nut crackers and various ratchet tools are employed. But cumbersome combinations of these tools are required, and the tools must be disposed in awkward orientations. Air chisels have been employed, but such devices are very noisy in operation. Also, acetylene torches and the like have been employed; however, there is a significant risk of fire and explosion when torches are used.

DISCLOSURES OF INVENTION

The shock absorber tool of this invention includes contiguous handle and body portions bent at a plurality of locations. A head assembly is carried by, and at an angle to the long axis of, the body portion. A complex bore is formed in the head assembly.

The shock absorber upper mounting shaft and nut are received by the bore. The tool is rocked by means of the handle portion, and the head assembly snaps the shaft disposed in the bore.

It is an object of this invention to provide a tool which facilitates faster, more efficient removal of worn out shock absorbers from vehicles.

Another object of this invention is provision of a tool for removing shock absorbers which is safer to use.

Also an object of this invention is provision of a tool so conformed as to extend around standard components of a vehicle to more efficiently reach the shock absorbers.

A further object of this invention is provision of a tool of simplified, substantially unitary construction which is capable of achieving the aforementioned objects.

These objects and other features and advantages of this invention will become readily apparent from the following description and drawing.

BRIEF DESCRIPTION OF THE DRAWING

The shock absorber tool of this invention is illustrated in the drawing wherein:

FIG. 1 is a side elevational view of the tool;

FIG. 2 is a top plan view of the tool;

FIG. 3 is an enlarged, cross-sectional view of the tool, taken along line 3—3 in FIG. 2, better showing components of the head assembly;

FIG. 4 is a fragmentary, enlarged elevational view showing operation of the tool, certain structures being shown in section for greater clarity;

FIG. 5 is an enlarged, fragmentary elevational view showing operation of a second embodiment of the tool, certain structures being shown in section for greater clarity;

BEST MODE FOR CARRYING OUT THE INVENTION

Figure 6:
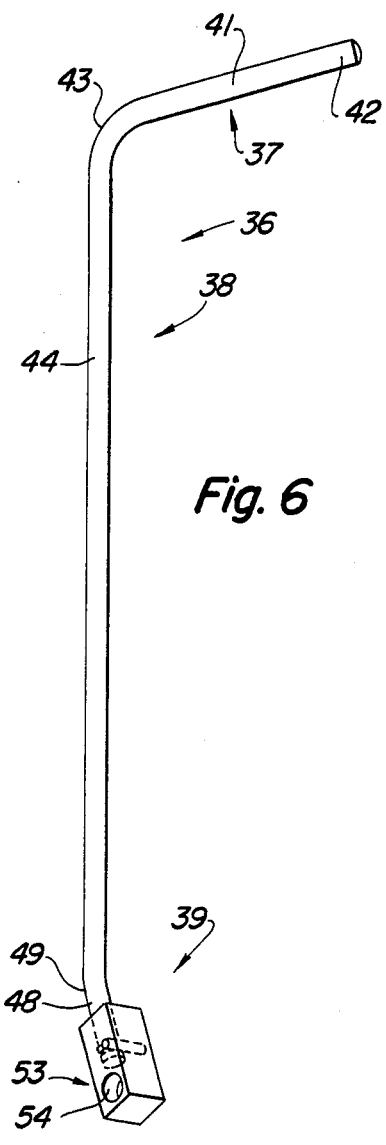
FIG. 6 is a top plan view of the second tool embodiment.

The shock absorber tool is shown generally at (11) in FIG. 3. More particularly, the tool (11) includes a handle portion (12), body portion (13) and head assembly (14).

Referring again to FIG. 3, the handle portion (12) generally is circular in cross section (see also FIG. 1). An elongated bar (16) includes a free end section (17). A curved section (18) is formed at the other end of the bar (16).

The body portion (13) also is generally circular in cross section and includes first and second straight lengths (19), (21). The first length (19) is contiguous with and extends from the curved section (18). The first length (19) joins the second length (21) at a bend (22).

The head assembly (14) includes a third straight length (23) also generally circular in cross section. The length (23) is joined to second length (21) at bend (24) and extends therefrom to terminate in a free and (25). An annular groove (26) is formed into the exterior surface of length (23) adjacent end (25) and defines a plane normal to the long axis of length (23).

The head assembly (14) also includes a head (27). A complex bore (28) is formed through, along the longitudinal axis of, head (27). The bore (28) includes three lengths (29), (31), (32). Length (29) begins at one end of the head (27) and has a first cross sectional diameter. Length (31) connects lengths (29), (32) and has a second cross sectional diameter. Length (32) extends from length (31) to the opposite end of head (27) and has a third cross sectional diameter. Length (31) forms a constricted area, as the second diameter is less than both the first and the third diameters. A locking bore (33) is formed through head (27). The bore (33) axis is normal to, but offset from, the bore (28) axis. The bore (33) does communicate with bore length (29).

As can be seen in FIG. 1, the bar (16) and lengths (19), (21), (23) define a plane. The long axes of bar (16) and first length (19) are disposed at an acute angle of about 65°. The long axes of lengths (19) and (21) are oriented at an acute angle of about 5°. The long axes of lengths (21) and (23) are disposed at an acute angle of about 30° with respect to each other.

A second embodiment of the tool is shown generally at (36) in FIG. 6. The tool (36) includes handle and body portions (37), (38) and head assembly (39).

The handle portion (37) includes an elongated bar (41) extending from a free end section (42) to a curved section (43).

The head assembly (39) includes a straight length (48) joined to bar (44) at bend (49). The length (48) terminates in free end (50). Annular groove (51) is formed into the length (48) exterior surface adjacent end (50) and defines a plane normal to the length (48) long axis.

The head (52) is elongated and rectangular in configuration, having first and second ends (52a), (52b). Adjacent second end (52b), a complex bore (53) is formed through head (52) normal to, and intersecting, the head (52) long axis. The bore (53) includes a first length (54) of relatively greater cross sectional diameter and a second length (56) of a constricting, relatively lesser cross sectional diameter. A second bore (57) is cut into first end (52a), and extends part way along the head (52)

long axis, but does not communicate with bore (53). A third, locking, bore (58) is formed through head (52), the bore (58) axis being normal to, but offset from, the bore (57) axis. The locking bore (58) communicates with bore (57).

Figure 7:
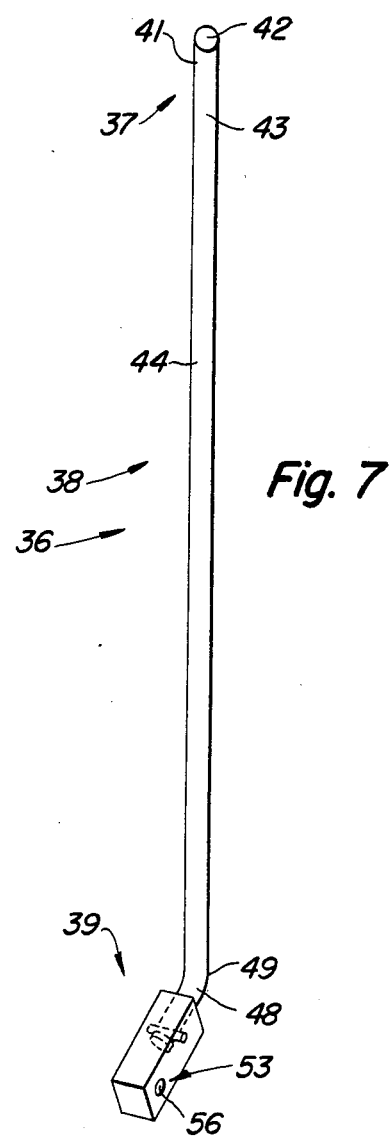
FIG. 7 is a side elevational view of the second tool embodiment.
Figure 8:
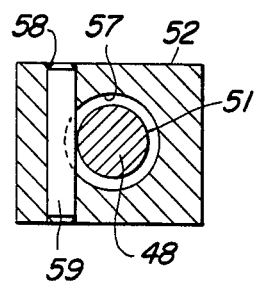
FIG. 8 is an enlarged, cross-sectional view of the second tool, taken along line 8—8 in FIG. 5, showing more clearly components of the head assembly.

The bars (41), (44) define a plane (see FIG. 7) out of which the head assembly (39) projects. The long axes of bars (41), (44) are disposed at an obtuse angle of about 110°. The long axis of straight length (48) forms an angle of about 30° with the plane of bars, (41), (44) (see FIG. 7). The long axis of length (48) forms another angle of about 25° with respect to a plane normal to that of bars (41), (44) and intersecting the long axis of bar (44), thereby extending generally to the same side of bar (44) as does bar (41) (FIG. 6).

The tool (11), (36) of this invention is formed from tool steel, hardened after machining, all processes known to those skilled in the arts of metal working. The bars and lengths (16), (19), (21), (23), (36), (38), (39) may be of 9/16 inch (about 1.43 cm) diameter.

Operation of the tool (11), (36) is shown in FIGS. 4 and 5. A standard shock absorber (61) is mounted to the automobile frame (62) by means of an upper mounting shaft (63). Upper and lower rubber grommets (64), upper and lower washers (66) and nut (67) secure the shaft (63) to frame (62).

The tool embodiment (11) is employed by selecting a head (27) with bore lengths (31), (32) of appropriate cross sectional diameter. The free end (25) fits into bore length (29), the annular groove (26) and locking bore (33) being disposed in the same plane normal to the length (29) axis. A locking pin (34) is inserted into the bore (33), thereby preventing the end (25) from slipping out of the head (27) but allowing the head (27) to rotate about the axis of length (23).

The tool (11) is grasped at the handle portion (12) by the mechanic. The head assembly (14) is guided over the shock absorber (61) (FIG. 4). The shaft (63) is received through enlarged bore length (32), into constricted bore length (31) and, depending on the shock absorber (61), into enlarged bore length (29). The nut (67) is received into enlarged bore length (32).

The tool (11) then is rocked back and forth, as indicated by the arrows in FIG. 4. The mounting shaft (63) is bent back and forth, weakens, and then snaps. When the break in shaft (63) is below the nut (67), the shock absorber (61) readily drops off the frame (62). When the break is above the nut (67), the length of threading (which usually is rusted or otherwise fouled) is reduced over which the nut (67) must be backed-off, and removal of the shock absorber is greatly facilitated. The tool embodiment (36) is employed by selecting a head (52) with bore lengths (54), (56) of appropriate cross sectional diameter. Free end (50) fits into bore (57) such that groove (51) and locking bore (58) are disposed in the same plane normal to the bore (57) axis. Locking pin (59) is inserted into bore (58). The head (52) thereby is locked onto, but permitted to rotate about the long axis of, length (48).

The tool (36) similarly is grasped by the mechanic at handle portion (37). The head assembly (39) is guided over shock absorber (61) (FIG. 5). The shaft (63) is received through bore (53), the nut (67) being received in enlarged bore length (54), and the shaft (63) being received in and projecting from constricted bore length (56). The tool (36) is rocked at aforementioned to snap the shaft (63).

The heads (27), (52) are selected such that the shaft (63) fits snugly within constricted bore lengths (31), (56).

The tool (11) particularly is employed for removal of front shock absorbers from U.S. model vehicles. The extension of handle portion (12) to one side of the long axis of head assembly (14), and the orientation of bar (16) and lengths (19), (21) facilitate clearance of the vehicle air conditioning unit and leverage against the shock absorber shaft (63).

The tool (36) particularly is employed for removal of rear shock absorbers. The positioning of the head assembly (39) with respect to handle portion (37) facilitates leverage against the shaft (63) and clearance of vehicle accessories.

INDUSTRIAL APPLICABILITY

It can be seen that removal and replacement of shock absorbers is greatly facilitated by the tool (11), (36). Shock absorbers are not readily accessible in vehicles. But this tool invention (11), (36) enables a mechanic to quickly reach, and effectively bear against, the shock absorber components. Cumbersome combinations of tools are avoided, as is use of noisy tools or dangerous torch tools and the like.

Although preferred embodiments have been disclosed herein, various modifications and alternate constructions can be made without departing from the full scope of the invention defined in the claims.

I claim:

1. A tool, for removing shock absorbers mounted to vehicles by shafts having securement nuts, comprising:
    body means;
    handle means joined at a first angle to said body means; and
    head means joined at a second angle to said body means and having a bore means for engaging a shock absorber, said bore means including a constricted bore length, said head means including a bar joined to said body means at said second angle, and a head carrying said constricted bore length and being removably and rotatably mounted on said bar, said bore means including a second bore length, formed in said head and communicating with said constricted bore length, for receiving said bar.

2. The tool of claim 1 and further wherein said head is selected from a plurality of heads, each head having a constricted bore length of different cross-sectional dimension, whereby a snug fit to the shock absorber shaft is attained.

* * * * *